United States Patent [19]

Ibbotson

[11] Patent Number: 5,456,747
[45] Date of Patent: Oct. 10, 1995

[54] ANTI GLARE AND/OR REFLECTION FORMULATION

[76] Inventor: Peter G. Ibbotson, P.O. Box 964, Springwood, Queensland, 4127, Australia

[21] Appl. No.: 244,766
[22] PCT Filed: Dec. 16, 1992
[86] PCT No.: PCT/AU92/00663
§ 371 Date: Jun. 10, 1994
§ 102(e) Date: Jun. 10, 1994
[87] PCT Pub. No.: WO93/12186
PCT Pub. Date: Jun. 24, 1993

[30] Foreign Application Priority Data

Dec. 16, 1991 [AU] Australia ................ PL0025

[51] Int. Cl.$^6$ .................................... C09D 101/18
[52] U.S. Cl. .................... 106/178; 106/171; 106/245; 106/253
[58] Field of Search .................... 106/171, 178, 106/245, 253

[56] References Cited

U.S. PATENT DOCUMENTS 2,604,414  7/1952  Pike ........................................ 106/178

Primary Examiner—David Brunsman
Attorney, Agent, or Firm—Christensen, O'Connor, Johnson & Kindness

[57] ABSTRACT

A material for reducing glare and reflection from reflective surfaces such as television screens, visual display units and windows. The material comprises a two part mixture of a lacquer and a flatting base. The lacquer consists of at least one $C_2$–$C_6$ aliphatic ester such as butyl acetate, at least one $C_1$–$C_6$ aliphatic alcohol such as n-butanol, at least one ketone such as acetone, nitrocellulose, a plasticizer such as diisooctyl phthalate, and an aromatic solvent such as benzene. The flatting base consists of an aromatic solvent such as benzene, a hydrocarbon solvent mixture, at least one $C_2$–$C_6$ aliphatic ester, synthetic silica, synthetic wax, an alkyd resin and an anti-settling agent such as castor oil.

12 Claims, No Drawings

ANTI GLARE AND/OR REFLECTION FORMULATION

This is a 371 of PCT/AU 92/00663 filed 16 December 1992.

THIS INVENTION relates to a material for use in the reduction of glare and reflection from reflective surfaces such as television screens, visual display screens, digital read-out screens, depth sounding screens, dial faced glass, most reversed image screens, and windows.

Glare and reflection are particular problems with VDUs giving rise to headaches, eyestrain, irritated eyes, blurred vision and many other symptoms. A large number of attempts have been made to address these problems such as by carefully arranging the background lighting, positioning the VDU in the most appropriate viewing location and/or using micromesh filters or glass or plastics films. None of these has been entirely successful. Mesh filters are one of the solutions to the problems of screen reflection but they do have adverse effects and the majority are extremely expensive.

It is therefore an object of the present invention to provide an expedient, inexpensive product for reducing glare and reflection which obviates the problems of known solutions.

According to the present invention, there is provided a material for application to a reflective surface to reduce the glare and/or reflection therefrom, said material comprising a lacquer dissolved in a flatting base; wherein the lacquer comprises at least one $C_2$–$C_6$ aliphatic ester, at least one $C_1$–$C_6$ aliphatic alcohol, at least one $C_2$–$C_8$ ketone, nitrocellulose, a plasticizer, and an aromatic solvent; and the flatting base comprises an aromatic solvent, a hydrocarbon solvent mixture, at least one $C_2$–$C_6$ aliphatic ester, silica, wax, an alkyd resin and an anti-settling agent; and wherein said material forms a transparent solid layer upon application to a reflective surface.

The invention also extends to the novel lacquer and the flatting base per se.

The preferred $C_2$–$C_6$ aliphatic ester is butyl acetate. The ester may be present in an amount of from 5–20% w/w in the lacquer and in an amount of up to 5% w/w in the flatting base.

The $C_1$–$C_6$ aliphatic alcohol may be any of the common alcohols but preferably one which is not too volatile. N-butanol is preferred. The quantity of alcohol will generally be within the range of 1–5% w/w.

Preferably, two ketones are used, viz a low carbon ketone such as acetone and a higher carbon ketone such as methyl isobutylketone. These may be present in a total amount of 20–30% w/w, each.

An example of the nitrocellulose which may be used is that sold by I.C.I. (Australia) Pty Ltd under the product code AHX8/13. The nitrocellulose is preferably incorporated in an amount of from 10–20% w/w.

The plasticizer is generally a non-volatile organic liquid plasticizer, such as diisooctyl phthalate, and is incorporated in an amount ranging from 1 to 3% w/w.

Preferred aromatic solvents are those comprising low weight aromatics such as benzene and its substituted derivatives such as toluene, and mixtures thereof. These are generally present in an amount of 1–5% w/w.

The hydrocarbon solvent mixture present in the flatting base will be the material produced during petroleum distillation. A typical example is one containing about 50% w/w aromatics and it may be present in an amount of 15–25% w/w.

The silica acts as a filler and is preferably a synthetic silica such as DEGUSSA OK412. This may comprise 5–10% w/w of the composition.

Preferably the wax is a synthetic wax present in an amount of 1–5% w/w.

The alkyd resin is a thermosetting polymer preferably comprising 70% N.V.M/toluene. It is suitably present in an amount of from 20 to 30% w/w.

The final constituent, namely the anti-settling agent can be an oil, such as castor oil, in a range of 0.1 to 0.5% w/w.

Preferably, the relative proportion of lacquer to flatting base is within the range of 5:1 to 20:1 on a weight basis.

The ingredients recited above are preferred materials and it is additionally to be borne in mind that any one or more of the ingredients may be omitted or substituted by a material of equivalent or similar properties.

The anti-glare formulation of the present invention is preferably got up in an aerosol using dimethyl ether as the propellant. However, application by pump spray, spray gun or the like may be more appropriate for large scale application such as to large windows in commercial buildings.

Preferred embodiments of the invention will now be described in the following examples.

EXAMPLE 1

Preparation of Lacquer

The following ingredients were mixed together in the sequence indicated and in the stated amounts until completely dissolved:

Butyl acetate 16.85% w/w

Butyl alcohol 3.52% w/w

Methyl isobutylketone 27.91% w/w

AXH 8/13 nitrocellulose 15.78% w/w

To this mixture was added, under constant stirring:

Diisooctyl phthalate 3.92% w/w

Acetone 27.89% w/w

Toluene 4.13% w/w

This mixture was a clear gloss r.f.p. aerosol lacquer.

EXAMPLE 2

Preparation of Flatting Base

A flatting base was prepared from the following ingredients in the stated amounts:

Toluene 38.25% w/w

Hydrocarbon solvent mixture (50% aromatics L.F.P.) 21.02% w/w

Butyl acetate 3.27% w/w

Synthetic silica (DEGUSSA OK412) 7.24% w/w

Synthetic wax 3.09% w/w

Alkyd resin (70% N.V.M./toluene) 26.81% w/w

Castor oil 0.32% w/w

EXAMPLE 3

Anti-Glare Composition

An anti-glare composition suitable for application to television and like screens, was prepared by mixing 87.7% w/w of the lacquer of example 1 with 12.3% w/w of the flatting base of example 2. The composition was got-up in an aerosol can by known means.

The composition when applied to a television screen was found to reduce glare by approximately 96%.

EXAMPLE 4

Anti-Glare Composition

An anti-glare composition suitable for application to video display units, was prepared by mixing 92.49% w/w of the lacquer of example 1 with 7.51% w/w of the flatting base of example 2.

The composition when applied to a VDU screen was found to reduce glare by approximately 84%.

EXAMPLE 5

Anti-Glare Composition

A high resolution anti-glare composition was prepared by mixing 94.09% w/w of the lacquer of example 1 with 5.91% w/w of the flatting agent of example 2.

The composition exhibited a glare reduction of between and 85% when applied to a reflective surface.

EXAMPLE 7

Anti-Glare Compositions

Three anti-glare compositions were prepared with the following components:

|  | A | B | C |
| --- | --- | --- | --- |
| Toluene | 9.317 | 7.298 | 6.150 |
| Acetone | 24.464 | 25.799 | 26.545 |
| Methylisobutylketone | 24.480 | 25.816 | 26.568 |
| n-butyl acetate | 15.180 | 15.831 | 16.194 |
| n-butanol | 3.084 | 3.252 | 3.346 |
| Hydrocarbon solvent (50% aromatics) LFP | 2.586 | 1.580 | 1.018 |
| Nitrocellulose (ICI AHX 8/13) (65% wet in ethanol) | 13.834 | 14.589 | 15.011 |
| Short oil coconut alkyd resin | 2.309 | 1.410 | 0.929 |
| Corflex 880 | 3.437 | 3.624 | 3.720 |
| Synthetic silica (DEGUSSA OK412) | 0.890 | 0.544 | 0.350 |
| Synthetic wax | 0.380 | 0.232 | 0.149 |
| Castor oil | 0.040 | 0.028 | 0.015 |

Composition A was suitable for TV screens, composition B for VDU's and composition C was a high resolution material.

TESTS

The relative reflectance of the anti-glare compositions were tested in the Photometric Laboratory in the Physics Department of the Queensland University of Technology.

Measurements were made by shining a standard incandescent light source onto glass coated with the anti-glare spray at different angles of incidence. The amount of reflected light was measured with a calibrated light-meter. The coated glass sample was then replaced with an uncoated sample and the measurement repeated.

The ratio of the reflected light from the coated glass slide to that from the plane glass slide gives the relative percentage reflectance of the anti-glare coating.

The ratio of reflected light from the glass coated with anti-glare to that from the uncoated glass is the percentage reflectance.

Measurements of relative reflectance were made at three angles of incidence, 10°, 20° and 45°. Coated samples tested were labelled TV(N) and VDU(N). Two samples of each were supplied (identified as TV(N)-1 and TV(N)-2, and VDU(N)-1 and VDU(N)-2) as well as an identical uncoated plane glass slide as the reference.

Sample TV(N)-1 corresponded to example 3 above, TV(N)-2 to example 7A, VDU(N)-1 to example 4 above and VDU(N)-2 to example 7B above.

The results are tabulated below.

| Sample | Angle of Incidence | Reflected Luminance | Percentage Reflectance |
| --- | --- | --- | --- |
| Uncoated | 10° | 0.291 | 100 |
|  | 20° | 0.340 | 100 |
|  | 45° | 0.474 | 100 |
| TV(N)-1 | 10° | 0.012 | 4.1 |
|  | 20° | 0.020 | 5.9 |
|  | 45° | 0.023 | 4.9 |
| TV(N)-2 | 10° | 0.012 | 4.1 |
|  | 20° | 0.021 | 6.2 |
|  | 45° | 0.022 | 4.6 |
| VDU(N)-1 | 10° | 0.055 | 19.0 |
|  | 20° | 0.080 | 23.5 |
|  | 45° | 0.096 | 20.3 |
| VDU(N)-2 | 10° | 0.056 | 19.3 |
|  | 20° | 0.081 | 23.8 |
|  | 45° | 0.096 | 20.3 |

It can be seen from above that the present compositions provide a useful and inexpensive solution to the problem of glare and thus provide a useful alternative to the public.

Whilst the above has been given by way of illustrative example of the invention, many modifications and variations may be made thereto by persons skilled in the art without departing from the broad scope and ambit of the invention as herein set forth in the following claims.

I claim:

1. A composition for application to a reflective surface to reduce the glare and/or reflection therefrom, said composition comprising
   (a) a lacquer comprising:
      (i) 5 to 20% w/w of at least one $C_2$–$C_6$ aliphatic ester,
      (ii) 1 to 5% w/w of at least one $C_1$–$C_6$ aliphatic alcohol,
      (iii) 20 to 30% w/w of at least one $C_2$–$C_8$ ketone,
      (iv) 10 to 20% w/w of nitrocellulose,
      (v) 1 to 3% w/w of a plasticizer, and
      (vi) 1 to 5% w/w of an aromatic solvent; and
   (b) a flatting base comprising:
      (i) 1 to 5% w/w of an aromatic solvent,
      (ii) 15 to 25% w/w of a hydrocarbon solvent mixture,
      (iii) up to 5% w/w of at least one $C_2$–$C_6$ aliphatic ester,
      (iv) 5 to 10% w/w of silica,
      (v) 1 to 5% w/w of wax,
      (vi) 20 to 30% w/w of an alkyd resin, and
      (vii) 0.1 to 0.5% w/w of an anti-settling agent;
wherein the lacquer is dissolved in the flatting base and the weight ratio of lacquer:flatting base is in the range 5:1 to 20:1.

2. A composition as claimed in claim 1, in which the $C_2$–$C_6$ aliphatic ester is butyl acetate.

3. A composition as claimed in claim 1, in which the $C_{1-C6}$ aliphatic alcohol is n-butanol.

4. A composition as claimed in claim 1, in which there are two $C_2$–$C_8$ ketones.

5. A composition as claimed in claim 4, in which the ketones are acetone and methylisobutylketone.

6. A composition as claimed in claim 1, in which the plasticizer is diisooctyl phthalate.

7. A composition as claimed in claim 1, in which the aromatic solvents are selected from the group comprising benzene, its substituted derivatives, and mixtures thereof.

8. A composition as claimed in claim 1, in which the hydrocarbon solvent mixture contains about 50% w/w aromatics.

9. A composition as claimed in claim 1, in which the silica is a synthetic silica.

10. A composition as claimed in claim 1, in which the wax is a synthetic wax.

11. A composition as claimed in claim 1, in which the alkyd resin is a thermosetting polymer comprising 70% NVM toluene.

12. A composition as claimed in claim 1, in which the anti-settling agent is castor oil.

\* \* \* \* \*